United States Patent [19]

Acoraci et al.

[11] Patent Number: 4,639,732

[45] Date of Patent: Jan. 27, 1987

[54] INTEGRAL MONITOR SYSTEM FOR CIRCULAR PHASED ARRAY ANTENNA

[75] Inventors: Joseph H. Acoraci, Phoenix; Alvin W. Moeller, Kingsville, both of Md.

[73] Assignee: Allied Corporation, Morristown, N.J.

[21] Appl. No.: 704,687

[22] Filed: Feb. 22, 1985

[51] Int. Cl.[4] .......................... H01Q 3/26; G01S 7/40; H04B 17/00

[52] U.S. Cl. .................................... 342/371; 342/165; 455/67

[58] Field of Search ................................ 343/371–375, 343/377, 368, 17.7, 369, 413; 455/67, 226; 364/483, 517; 324/58 R, 58 A, 58 B, 144

[56] References Cited

U.S. PATENT DOCUMENTS

| | | | |
|---|---|---|---|
| 4,107,688 | 8/1978 | Alford | 343/413 |
| 4,176,354 | 11/1979 | Hsiao et al. | 343/17.7 |
| 4,316,192 | 2/1982 | Acoraci | 343/373 |

*Primary Examiner*—Theodore M. Blum

*Assistant Examiner*—Gregory C. Issing

*Attorney, Agent, or Firm*—Bruce L. Lamb; Robert M. Trepp

[57] ABSTRACT

The circular phased array antenna includes a plurality of radiating elements spaced about the circumference of a mounting ring. The radiating elements are fed with r.f. currents having relative phase and amplitude distribution to form a focused beam from the antenna. The beam is steerable to a selected direction. The monitor system includes a probe element mounted near each radiating element, phase shifters and couplers for combining signals from the probes into a transmission line. The amplitude of the transmission line signal is compared with a known value of signal for a normally operating antenna for each beam direction. A failure alarm is generated whenever the difference between the compared signals exceeds tolerance.

7 Claims, 10 Drawing Figures

FIG. 4A
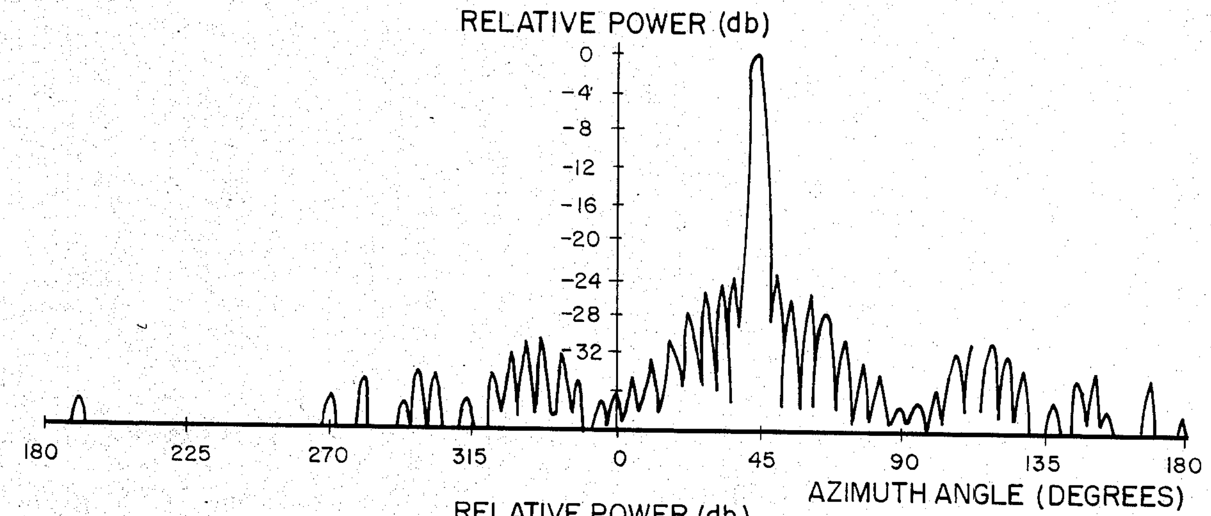
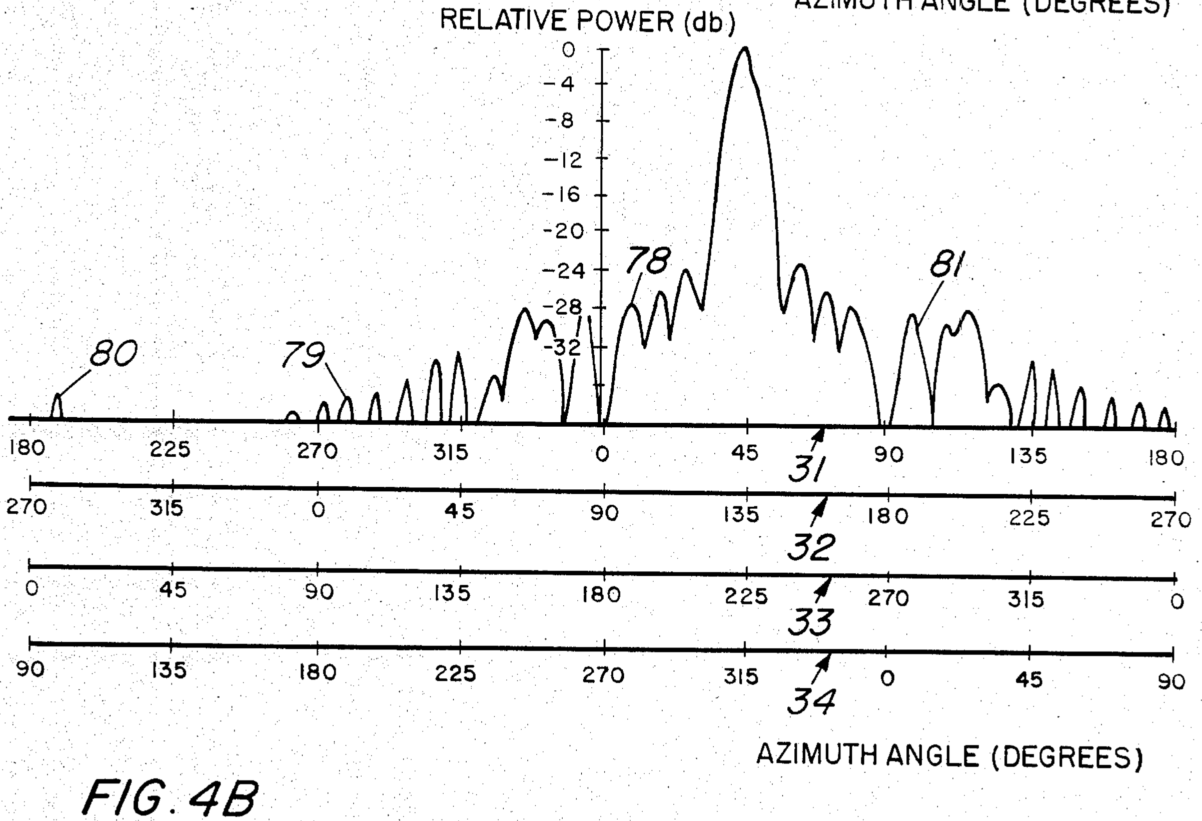
FIG. 4B

FIG. 5A
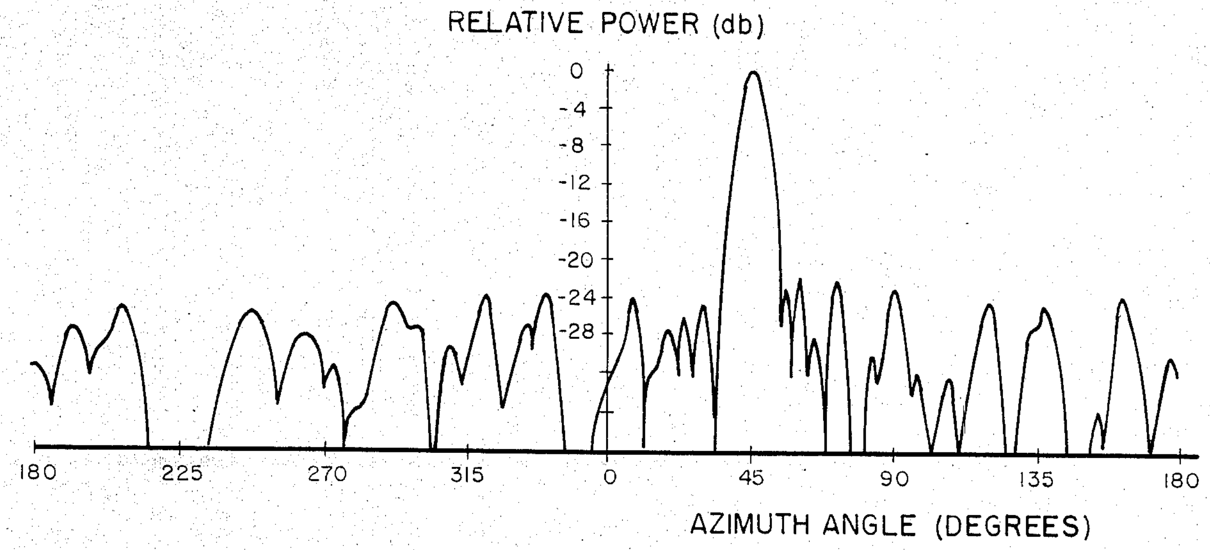
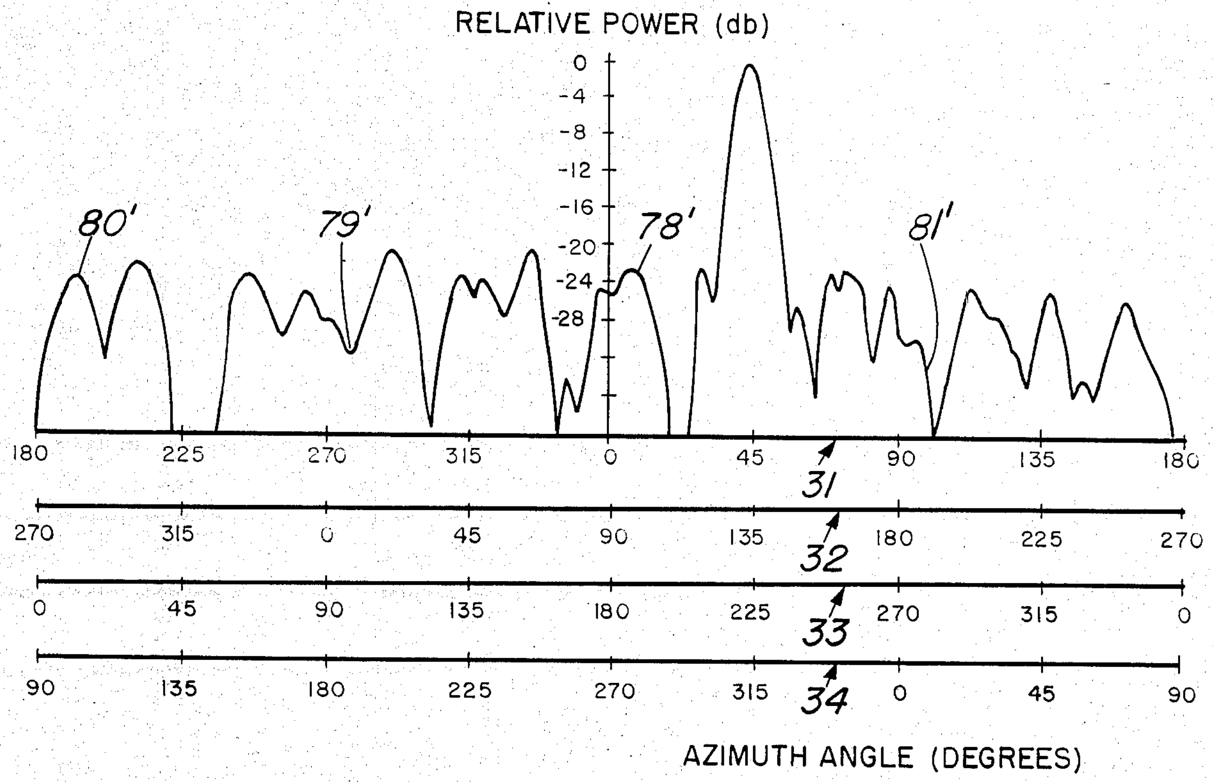
FIG. 5B

INTEGRAL MONITOR SYSTEM FOR CIRCULAR PHASED ARRAY ANTENNA

The present invention relates to a system for monitoring the effective power radiated by a phased array antenna. More particularly it relates to a system for monitoring the main beam peak power and side lobe power levels of a scanning circular phased array antenna.

Array antennas comprise a plurality of radiating elements disposed linearly, circularly or distributed over a geometric surface according to the coverage and beam characteristics desired of the antenna. Each of the antenna elements is fed with r.f. power at controlled relative amplitude levels and phases to produce a desired far field radiation pattern and beam pointing direction. The required amplitude and phase distributions are produced by various forms and combinations of feed networks, power dividers, fixed and variable phase shifters which couple a common source of r.f. power to the individual radiating elements. The multiplicity of transmission paths between the power source and the radiating elements and the components associated therewith presents the possibility of failures occurring at one or more points in a transmission path or paths, the net result of which may be less than total failure of the antenna, but which may still be sufficient to degrade the performance of the antenna below an acceptable level.

To insure the integrity of operation of a phased array antenna, it is highly desirable to provide a monitoring system capable of determining the far field beam characteristics throughout the coverage area of the antenna. One obvious means of accomplishing this function is to position a receiving antenna having an omnidirectional pattern at some distance from the phased array antenna, within the coverage area and far field of the phased array antenna. Signal from the receiving antenna is fed to a power meter and comparison means where the measured power levels of the received signal at various scan angles of the phased array are compared with the power levels predicted at the various scan angles. If the difference between the measured power level for a particular scan angle and the predicted power level at that scan angle exceeds a tolerable amount, a fault alarm is given.

It may not always be possible to install a monitor antenna at a suitable location in the far field of the phased array antenna. The phased array antenna beam elevation angle may be such as to require that the monitor antenna be mounted at an excessive height. Shipboard installations of phased array antennas create particularly difficult problems in siting a far field monitor antenna since a suitable location for the monitor antenna for a large part of the phased array antenna coverage may simply not exist on board the ship.

Apart from siting problems, a far field monitoring system has the disadvantage that factors other than failures in the phased array antenna may cause differences between the measured and predicted power levels at the monitor antenna and thus lead to the generation of false alarms. For example, a vehicle may intrude in the space separating the monitor antenna from the phased array antenna and cause severe distortion in the radiation pattern received by the monitor antenna.

To overcome such problems associated with far field monitoring there has been developed, prior to the present invention, an integral monitoring system for linear phased array antennas used in the microwave landing system. The integral monitoring system for the linear phased array antenna comprises a slotted waveguide extending the length of the array. The waveguide is mounted on the ground plane reflector of the array with a waveguide coupling slot for each radiating element of the array evenly spaced along the length of the waveguide with each slot at an equal distance from its associated radiating element. The coupling factor for each of the slots is adjusted to correspond to the amplitude taper applied to the array elements to control the shape of the antenna beam. Energy from the radiating elements is coupled into the waveguide with the introduction of a constant differential phase shift at each slot. The normalized power measured by a detector placed at either end of the waveguide is equivalent to that which would be measured by a detector located in the far field of the antenna at a particular fixed beam pointing angle. Such pointing angle depends upon the value of the waveguide slot differential phase shift. The antenna beam pattern is reproduced at the integral monitor detector when the antenna is scanned so that the pointing angle of the antenna beam sweeps through the fixed angle of the monitor.

The present invention is similar to the prior integral monitor for a linear phased array antenna in that the invention employs monitoring probes mounted as an integral part of a phased array antenna and a coupling network for combining the energy received by the probes into a reproduction of the antenna far field beam pattern.

It is an object of the present invention to provide an integral monitoring system for a circular phased array antenna.

It is another object of the invention to provide an integral monitoring system for a circular phased array antenna capable of monitoring the performance of the antenna throughout the 360° azimuth coverage area of the antenna.

It is still another object of the invention to provide an integral monitoring system for a circular phased array antenna providing a detector output equivalent to the output of a detector located at a fixed point in the far field of the antenna.

Briefly, the invention comprises an integral monitor system for a circular phased array antenna wherein the array antenna is formed by a plurality of radiating elements spaced equally about the circumference of a mounting ring. The radiating elements of the array are fed with r.f. currents having a particular amplitude and phase distribution designed to control the beamwidth and side lobe levels of the radiation pattern of the array. The monitor system includes a signal pick-up circuit, which is secured to the mounting ring of the array. The monitor signal circuit includes a plurality of coupling probes, one for each radiating element or column of radiating elements of the array. Each coupling probe is located in near proximity to a radiating element of the array and is connected through a line length providing a fixed phase offset type phase shifter and through a directional coupler to a common transmission line. The directional coupler and the line length phase shifter of each coupling probe are adjusted to provide an equal value of amplitude coupling and an equal but negative phase compared to the amplitude and phase of the radiating element associated with that probe. When the array is scanned in azimuth, the response pattern of signals on the transmission line of the monitor signal circuit corresponds to the radiation pattern for the array as measured by a detector located at a fixed point in the far field of the array. The monitor system includes data storage means containing threshold values for the monitor signal correlated with values of the azimuth scan angle of the array and an amplitude comparator for comparing the monitor signal obtained during operation of the array with the stored thresholds. The amplitude comparator triggers a fault indicator whenever the difference between the monitor signal amplitude and the stored threshold becomes excessive.

In the drawings:

FIG. 4A is a diagram showing the radiation pattern of the array of FIGS. 1 and 3A measured at a point located in the far field along a 45° azimuth radial from the array, when the array is fully functional;

FIG. 4B is a diagram showing the response patterns of the four monitor signal circuits of FIG. 3A when the fully functional array is scanned through 360° in azimuth;

FIG. 5A is a diagram, similar to FIG. 4A, except that three phase shifters controlling the array beam direction have been disabled;

FIG. 5B is a diagram showing the response patterns of the four monitor signal circuits under the same conditions as FIG. 5A.

Figure 1:
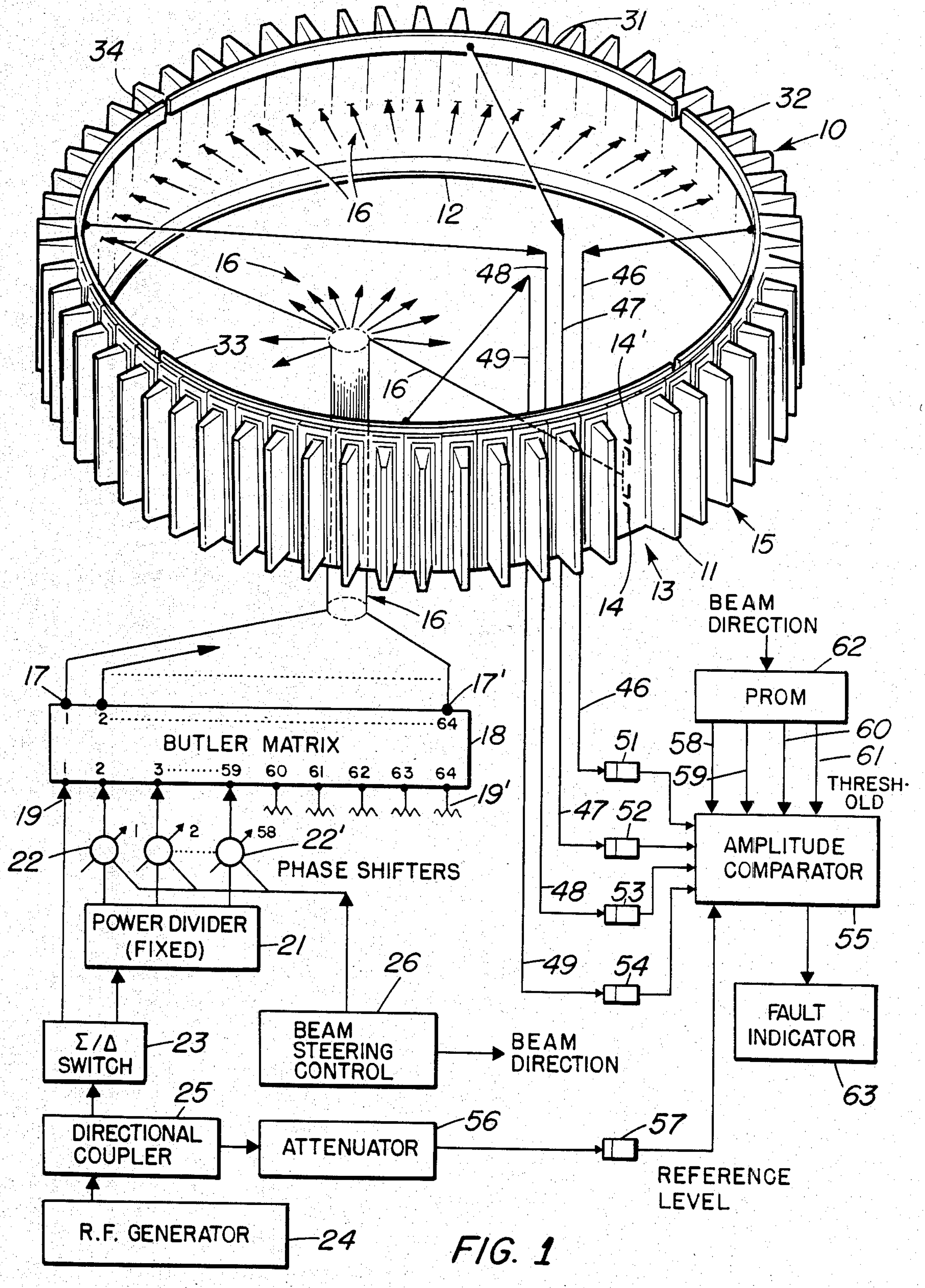
FIG. 1 is a combined pictorial and functional block diagram of a circular phased array antenna equipped with the monitor of the invention.

FIG. 1 illustrates a circular phased array antenna incorporating the integral monitoring system of the invention. The antenna 10 comprises an array of sixty four radiating elements 15 mounted equally spaced about the periphery of a supporting ring 12. As seen at 13, each of the radiating elements 15 comprises a pair of stacked dipoles 14, 14'. Except at 13, the radiating elements 15 are shown covered by a protective housing 11 which is transparent to r.f. energy. Each of the elements 15 is fed r.f. energy by an individual transmission line 16 of a total of sixty four such lines. Each element 15 has associated therewith a power divider (not shown) which divides equally between its constituent dipoles the energy received from its associated transmission line. The transmission lines 16 are all of equal length and connect particular elements of the array 10, according to their position on the array, to particular ones of a total of sixty four output ports 17—17' of a Butler matrix-type beam forming network 18.

Butler matrices, known per se in the art, have the quality of providing the proper phase and amplitude distributions of currents fed to elements of an array to produce a focused beam. The pointing direction of the beam is dependent upon the particular matrix input port or ports 19—19' energized. When input ports 19—19' are appropriately energized through a fixed power divider 21 and variable phase shifters 22—22' the beam of array 10 may be steered to any angle within a 360° azimuth coverage area by adjustment of the phase shifters alone.

U.S. Pat. No. 4,316,192 issued Feb. 16, 1982, to J. H. Acoraci, a co-inventor herein, describes a circular phased array antenna composed of eight circularly disposed columns of eight elements each which is controlled through a beam forming Butler matrix. The array of the referenced patent is capable of producing sum (Σ) and difference (Δ) beam patterns, as described in the patent, which are particularly useful for side lobe suppression when the array is employed for transmitting and receiving interrogation signals to airborne transponders in an air traffic control or target identification system. Similar provision is made for changing the beam pattern of the array 10 through operation of a Σ/Δ switch 23. Power is supplied to switch 23 by an r.f. generator 24. A small portion of the output power of generator 24 is diverted through directional coupler 25 for use in the monitor system, as later described herein. As previously mentioned, the beam direction of array 10 is steerable to any angle within a 360° azimuth coverage area by adjustment of phase shifters 22—22'. Preferably these phase shifters are of a digital type controlled by a digital command signal from a beam steering control unit 26. In one specific embodiment of the invention the array 10 is designed to operate in the frequency band of 1030–1090 MHz. The diameter of mounting ring 12 is nine feet and the array beam is steerable through 360° in 1024 discrete steps.

Figure 2A:
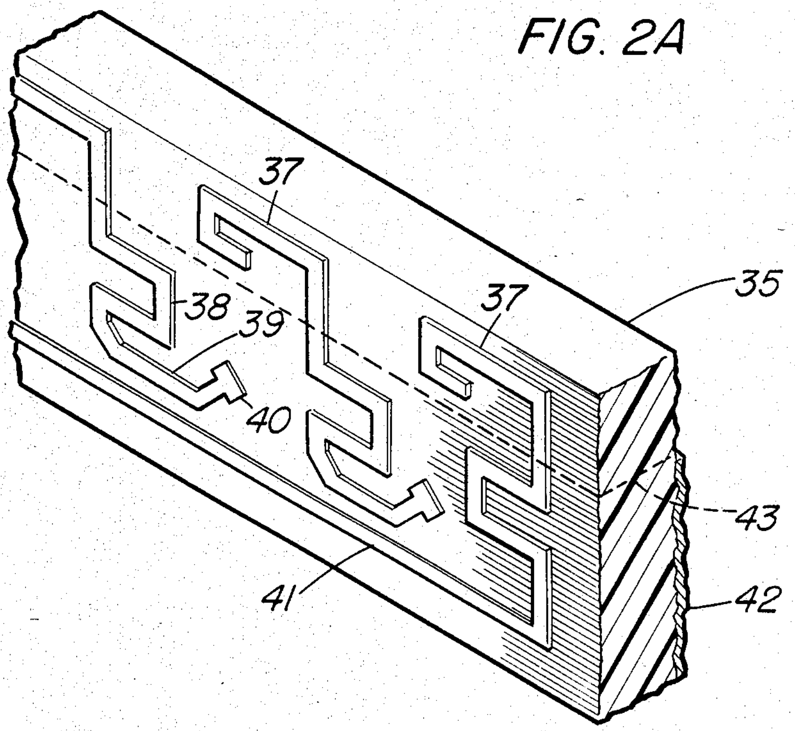
FIG. 2A is an isometric view of a portion of a stripline circuit board forming part of the monitor signal circuit.
Figure 2B:
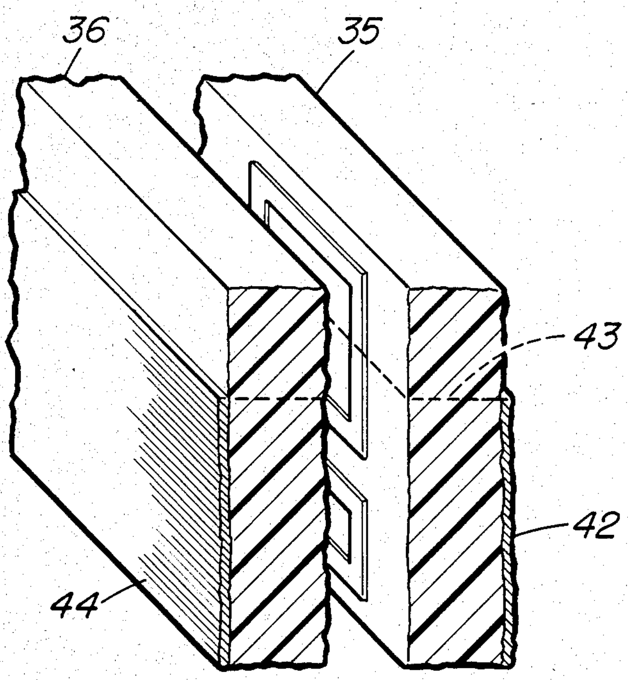
FIG. 2B is an isometric view of separated portions of stripline board, one of which boards is shown in FIG. 2A, which are laminated together to form the monitor signal circuit.

The monitor system includes four monitor signal circuits 31–34 mounted at the top of array 10. As best seen in the partial views of FIGS. 2A and 2B, each of the signal circuits 31–34 is of stripline construction comprising a laminate of two dielectric boards 35 and 36. A circuit pattern printed on the face of board 35 includes a coupling probe portion 37, a phase shifter line length portion 38, a directional coupler 39 and a terminating resistor 40. The circuit also includes a transmission line 41 extending the length of board 35 along the bottom thereof. One such coupling probe 37 is provided for each element of the array 10, there being sixteen such probes for each of the circuits 31–34. A copper foil backing extends continuously along the back face of board 35 from the bottom thereof to the height of dashed line 43, which is above the height of the phase shifter portions 38. Board 36 contains no printed circuit forms, but supports on the face thereof a layer of copper foil 44 extending continuously along the length of the board to the height of backing foil 42. When boards 35 and 36 are laminated together only the coupling probes 37 extend above the height 43 of the front and back conductive foils 44 and 42, thereby shielding all portions of the circuit of board 35 from radiation from the elements of array 10, except the coupling probe portions 37 thereof.

Figure 3B:
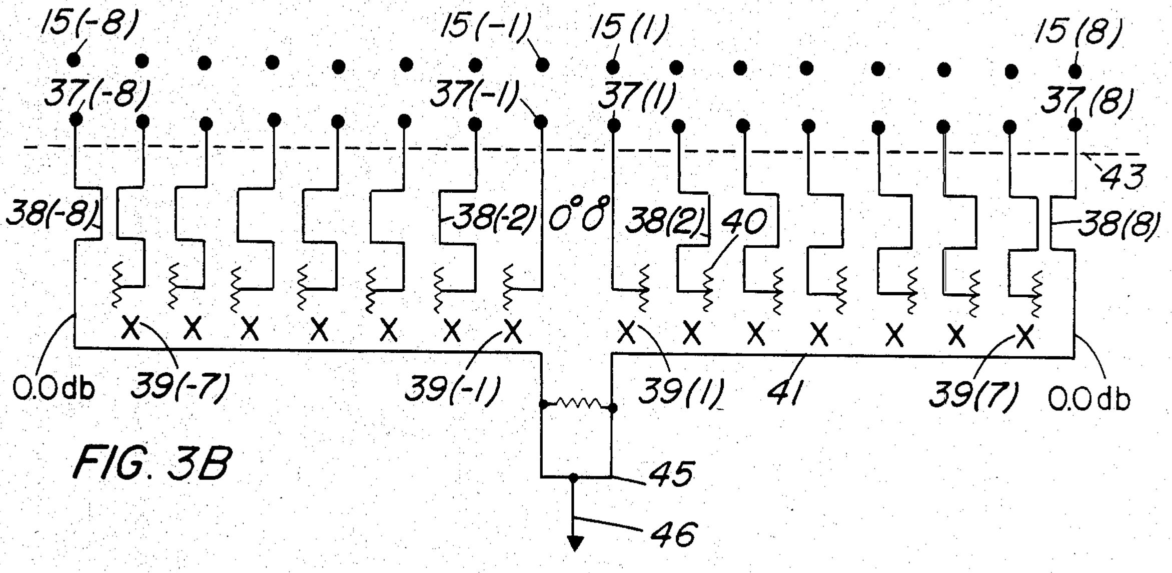
FIG. 3B is a schematic diagram of a monitor signal circuit mounted in one quadrant of the array of FIG. 3A.
Figure 3A:
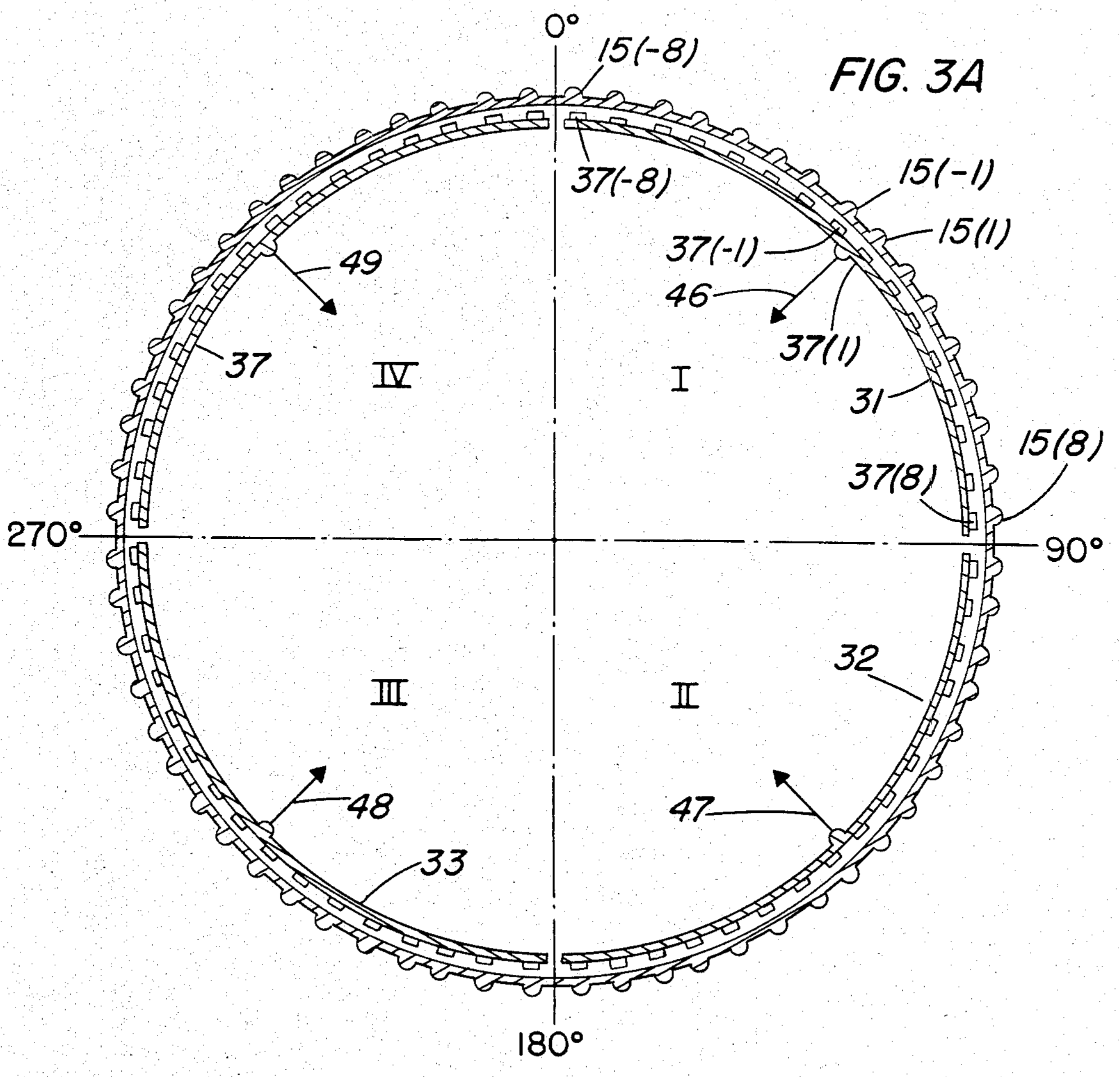
FIG. 3A is a diagram showing the placement of four monitor signal circuits with respect to the radiating elements of a sixty-four element circular phased array antenna.

As shown in FIG. 3A, the monitor signal circuits of FIG. 2 are most conveniently fabricated in lengths equal to one-quarter of the circumference of the array 10. The circuit boards are formed into arcuate sections having the same radius of curvature as the array 10 and are mounted coaxially therewith at the upper edge of the array. The board sections are identical in construction and only board section 31 situated in azimuth quadrant I will be described in detail. Commencing at the center of each board, the array elements lying to the right of center are identified as 15(1)–15(8). The array elements lying to the left of the board center are numbered 15(-1) through 15(-8). Referring to FIG. 3B, each coupling probe 37, except probes 37(1) and 37(-1) associated with array elements 15(1) and 15(-1) adjacent the board center, is connected to a phase shifter 38(2) through 38(8) and 38(-2) through 38(-8). Transmission line 41 is divided into equal length right and left branches at the board center by a two-way power divider 45 which combines the power in the two branches to feed one of four separate transmission lines 46–49. All probes except probes 37(8) and 37(-8) at the ends of each board couple the energy received thereby into one of the branches of transmission line 41 through one of fourteen directional couplers 39(1) through 39(7) and 39(-1) through 39(-7). The values of the coupling factors for the directional couplers 39 and the values of the phase shifters 38 for the specific nine foot diameter array mentioned above are given in the table below.

| Probe 37 ( ) | Phase Shifter 38 ( ) Degrees | Directional Coupler 39 ( ) Coupling Factor db |
|---|---|---|
| 1, −1 | 0 | −7.243 |
| 2, −2 | −13.576 | −5.562 |
| 3, −3 | −49.889 | −5.832 |
| 4, −4 | −87.751 | −5.344 |
| 5, −5 | −144.034 | −3.947 |
| 6, −6 | +130.384 | −2.142 |
| 7, −7 | +40.690 | −2.768 |
| 8, −8 | −37.769 | 0.0 |

The coupling factors correspond to the amplitude distribution of energy fed to array elements 15(1) through 15(8) and 15(-1) through 15(-8). The phase shift angles are the negative values of the phase distribution to the array elements.

Again referring to FIG. 1, the energy collected by monitor circuits 31–34 and furnished to transmission lines 46–49 is detected in separate detectors 51–54. The outputs of these detectors enter an amplitude comparator 55, later more fully described, where they are first compared with a reference level signal to determine the relative power levels of each detector output. The reference level signal is obtained from the portion of the output of r.f. generator 24 diverted by directional coupler 25 through an attenuator 56 and detected by detector 57. Amplitude comparator 55 compares the relative power level outputs of monitor circuits 31–34 with separate threshold levels 58–61 called up from a programmable read only memory (PROM) 62 in accordance with the beam direction command signal from beam steering control 26. The threshold levels 58–61 define limits by which the effective performance of the array 10 can be judged. Whenever a defect occurs anywhere within the transmission path beginning at r.f. generator 24 and ending at the radiating elements 15 of the array, the radiation pattern of the array will be affected to some extent. Such effects will be noticed usually as a broadening of the beam pattern, a decrease in the beam peak power level or an increase in the side lobe power levels. Minor defects may occur which produce a noticeable change in the array radiation pattern, but such changes may not be severe enough to declare the array unfit for service. For example, up to three of the phase shifters 22—22' may fail without causing an increase in beam side lobe power levels, a decrease in beam peak power level or an error in beam pointing direction greater than a tolerable amount. As will shortly be described, comparison of the threshold levels 58–61 with the relative power output levels of detectors 51–54 in amplitude comparator 55 provides a means for determining whether the side lobe and peak power levels of the radiation pattern of the array have departed from tolerance. If the comparison reveals such departure, amplitude comparator 55 triggers a fault indicator 63 to advise operating personnel of the existence of defects in the system.

The operation of the monitoring system will now be described with reference to FIGS. 4A, 4B, 5A and 5B. FIG. 4A is the radiation pattern of the array 10 measured by a detector located at a point in the far field on the 45° radial bearing from the array, as the array beam is scanned through 360° in azimuth. FIG. 4B is a plot of the relative power output of monitor circuit 31, situated in azimuth guadrant I, as the array beam is scanned through 360° azimuth. FIG. 4B shows a broader main lobe and broader side lobes than are exhibited in the array pattern of FIG. 4A. The response pattern of FIG. 4B is, however, remarkably similar to the radiation pattern of FIG. 4A in the locations and relative power levels of the peaks of the main lobe and side lobes. The patterns of FIGS. 4A and 4B were taken with a fully operative array. The responses of monitor circuits 32–34, respectively situated in azimuth guadrants II, III and IV, are similar to that shown for circuit 31, except that the patterns for circuits 32–34 are progressively shifted 90° in azimuth, as is indicated by the three lower azimuth scales of FIG. 4B.

FIG 5A is the radiation pattern of the array, measured as in FIG. 4A, with three randomly located phase shifters 22 (FIG. 1) disabled. The significant difference between the patterns of FIGS. 5A and 4A is that FIG. 5A shows substantial increase in the side lobe levels for azimuth angles far off boresight, i.e. from 90° through 0°.

FIG. 5B shows the response of monitor circuit 31 for the same failure conditions as produced the pattern of FIG. 5A. Substantial similarly is seen between the side lobe locations and levels of FIGS. 5A and 5B. In particular, it is to be noted that the same marked increase in side lobe levels for azimuth angles far off boresight appears in FIG. 5B as appears in FIG. 5A. When the number of phase shifter failures in the array increases beyond three, still further increase is noted in the levels of the side lobes far off boresight. Also, the peak level of the main lobe decreases by several d.b.

Figure 6:
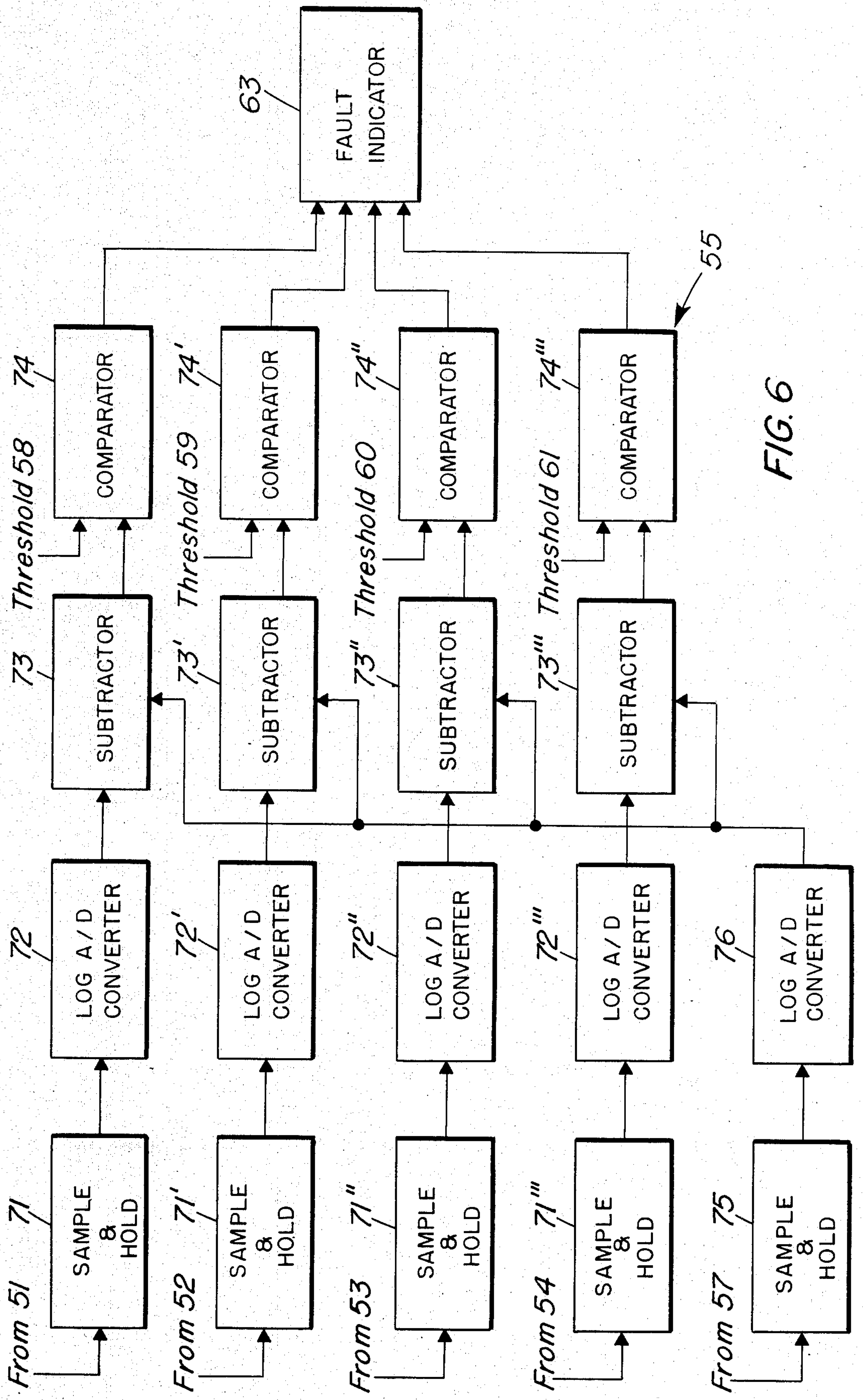
FIG. 6 is a functional block diagram showing the elements contained in the amplitude comparator of FIG. 1.

The operation of the monitor system will now be described with reference to FIG. 4B and FIG. 6. Referring to FIG. 6, which shows the elements included in amplitude comparator 55 of FIG. 1, the outputs of detectors 51–54 are fed to individual channels, each comprising a sample and hold circuit 71, a logarithmic analog-to-digital converter 72, a subtractor 73 and a comparator 74. The output of detector 57 is fed to sample and hold circuit 75, the output of which is converted to a digitized logarithmic function in logarithmic A/D converter 76. The difference between the outputs of converters 72—72''' and the output of reference converter 76 is produced at the outputs of subtractors 73—73''', which outputs respectively comprise the relative power output signals of monitor circuits 31–34, as shown in FIG. 4B for a fully operative array.

PROM 62 (FIG. 1) has stored therein the four separate values of thresholds 58–61 for each of the 1024 positions, covering 360° in azimuth to which the beam of the array may be steered. These threshold values are the relative power output signals for monitor circuits 31-34 shown in FIG. 4B. The stored values of thresholds 58-61 are called up from PROM 62 in accordance with the digital beam direction command signal from beam steering control 26 and are applied respectively to digital comparators 74—74'''. The signal outputs of monitor circuits 31-34 appearing at the output of subtractors 73—73''' are also applied respectively to comparators 74—74'''. If the difference the values of the pairs of signals compared in any one of the comparators 74—74''' exceeds a tolerable amount, an output from a comparator showing such excessive amount triggers fault indicator 63 to give an alarm of the failure.

As a particular example, assume that the beam steering command is for 10° azimuth. Then referring to FIG. 4B, the values for thresholds 58-61, shown respectively by the points 78-81, will be approximately −28, −37, −38 and −30 d.b. If a failure occurs in the array such as to cause the response pattern of FIG. 5B, then the values of the outputs of subtractors 73—73''', shown by the points 78'-81' of FIG. 5B are approximately −24, −29, −25, and −34 d.b. If the tolerable difference between any of the pairs of signals compared in comparators 74—74''' is 3 d.b., then all comparators, in this instance, would produce an output to trigger fault indicator 63.

Obviously, the invention may be practiced otherwise than as specifically described without departing from the spirit and scope of the appended claims.

The invention claimed is:

1. In a circular phased array antenna having a mounting ring, a plurality of radiating elements spaced about the circumference of the mounting ring, means of feeding r.f. currents to said radiating elements with relative amplitudes and phases whereby energy is radiated from said antenna in a focused beam, and means for steering said beam to a selected direction, a monitor system for warning of failures in the array antenna comprising, a monitor signal circuit secured to said array mounting ring, said signal circuit being divided into a plurality of like segments, each said segment being formed as a microstrip printed circuit and including:

a plurality of probes, each said probe being located in near proximity to separate ones of said radiating elements of said array and receiving energy principally from its associated one of said radiating elements;

individual phase shifter means connected to each said probe;

a transmission line and individual coupling means connected to each said phase shifter means for coupling energy from said phase shifter means into said transmission line, said phase shifter means and said coupling means for each said probe being adjusted to provide a phase shift negative to and an amplitude corresponding to the relative phase and amplitude of the r.f. current in the radiating element associated with that said probe;

said segments being secured to said array mounting ring end to end so as to encircle said array mounting ring;

data storage means having stored therein threshold data indicative of the amplitude of the signal appearing on said transmission line of each said signal circuit segment for each selected direction of the array beam for a normally operating array;

amplitude comparator means for comparing the amplitude of signal appearing on said transmission line for each said signal circuit segment at a particular beam direction of said array with data retrieved from said storage means for each said transmission line for that particular beam direction; and fault indicator means for signaling a fault condition in said array whenever the difference between the signal amplitude and the threshold data retrieved from said storage means and compared in said comparator means for any one of said transmission lines exceeds a predetermined amount.

2. An monitor system for a circular phased array antenna as claimed in claim 1 wherein said monitor signal circuit comprises an elongated insulating substrate, a circuit pattern adhered to said substrate, said circuit pattern including:

a plurality of separated, conductive first tracks constituting said monitor signal circuit probes, said first tracks being spaced from one another along said substrate at distances equaling the spacing between said array radiating elements on said mounting ring;

a plurality of separated conductive second tracks, each said second track being connected to and forming an extension of separate ones of said first tracks, said second tracks constituting said phase shifters and being of various lengths relative to one another to provide phase shifts in the currents conducted thereby which are negative to the phases of r.f. currents in said array radiating elements associated with said first track connected thereto, a third conductive track extending the length of said substrate, and a plurality of fourth conductive tracks, each of which is connected to separate ones of said second tracks at the ends of said second tracks opposite said first tracks, said fourth tracks each being adapted to couple directionally energy from the one of said second tracks connected thereto into said third track with a relative amplitude corresponding to the relative amplitude of r.f. current in the array radiating element associated with the one of said first tracks connected to that said second track.

3. A monitor system for a circular phased array antenna as claimed in claim 2 wherein said first, second and fourth tracks extend generally perpendicular to said third track.

4. A monitor system for a circular phased array antenna as claimed in claim 3, with additionally, a second elongated insulating substrate laminated to the first-mentioned substrate in contact with said circuit pattern, and a conductive layer adhered to the face of said second substrate opposite the face thereof in contact with said circuit pattern, said conductive layer extending the length of said circuit pattern and extending to such height as to overlie said second, third and fourth tracks of said circuit pattern.

5. A monitor system for a circular phased array antenna, said antenna a mounting ring, a plurality of radiating elements spaced equally about the circumference of said mounting ring, means for feeding r.f. currents to said radiating elements with relative amplitudes and phases whereby energy is radiated from said antenna in a focused beam, and means for steering said beam to a selected direction, comprising a monitor signal circuit, said circuit including a plurality of probe elements, means for securing said probe elements to said mounting ring of said antenna with the spacing between said probe elements corresponding to the spacing between said radiating elements of said antenna, each said probe element being located in close proximity to one said radiating element of said antenna;

a center fed transmission line having branches extending equal lengths to the right and to the left of the feed point thereof, said feed point being located on said mounting ring, the right and left branches of said transmission line extending circumferentially along said mounting ring beneath said probe elements;

means for shifting the relative phase of the signal received by each said probe element an amount which is the negative value of the relative phase of the r.f. current fed to the one of said radiating elements associated with that said probe element when the antenna beam is pointed along a radial line from said mounting ring passing through said transmission line feed point;

means for coupling said phase shifted signals of each said probe into one of said transmission line branches with a relative amplitude corresponding to the relative amplitude of r.f. current fed to the one of said radiating elements associated with that said probe element when the antenna beam is pointed along said radial line;

a second transmission line connected to the feed point of said first-mentioned transmission line;

means for comparing the amplitudes of signals on said second transmission line with known values of signals on said second transmission line obtained from a normally operating antenna at various beam pointing angles; and means for producing a failure warning whenever the difference between the amplitudes of signals compared in said comparing means exceeds a predetermined amount.

6. A monitor system as claimed in claim 5 wherein the same values of relative phase and the same values of relative amplitude apply to signals coupled into said transmission line from each of a pair of probe elements symmetrically located on said mounting ring with respect to said transmission line feed point.

7. A monitor system as claimed in claim 5 wherein said monitor signal circuit is comprised of a plurality of similar printed circuits, each of said printed circuits including:

a plurality of probe elements;

phase shifting means for each of said probe elements;

a center fed transmission line having equal length right and left branches; and means for coupling signals from said phase shifting means into one of said transmission line branches;

said printed circuits being secured to said mounting ring so that the feed point of each said transmission line of each said printed circuit lies on said mounting ring along a different radial line from said mounting ring;

said second transmission line being comprised of a plurality of individual transmission lines, each said individual transmission line being connected to a separate one of said printed circuit transmission line feed points.

* * * * *